Sept. 23, 1941.   C. WOIWODE ET AL   2,256,917
SCENTED FABRICATED ARTICLE
Filed April 18, 1939
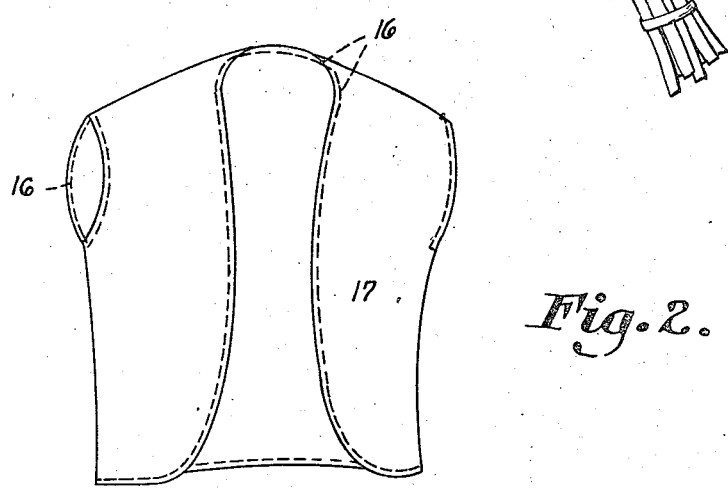
INVENTORS
Carl Woiwode   Adolph Cohen
BY
ATTORNEY Patented Sept. 23, 1941

2,256,917

UNITED STATES PATENT OFFICE 2,256,917

SCENTED FABRICATED ARTICLE

Carl Woiwode, Yonkers, and Adolph Cohen, New York, N. Y.

Application April 18, 1939, Serial No. 268,604

7 Claims. (Cl. 41—14)

This invention relates to scented fabricated articles, for instance artificial flowers or similar objects or ware assembled from fabrics.

The artificial flower is ordinarily distinguished over a natural flower by way of a lasting quality. But natural flowers commonly have a fragrance limited in accordance with the short life of the flower, and very little success has up to this time been attained in imparting to an artificial flower a fragrance similar to that of the simulated natural flower and having a lasting property corresponding to the longer period of life or service of an artificial flower.

It is a particular object of this invention to provide a fragrance in an artificial flower, which fragrance is similar to that of the flower simulated thereby, such fragrance being lasting or coextensive with the expected period of usefulness of the article.

It has been attempted in the past to incorporate in an artificial flower one or more containers, which are filled with a liquid perfume or which is made of or filled with an absorbent material suited for retaining the liquid perfume. But the fluids serving as perfumes are highly volatile, and will evaporate from such container within a limited time. But the odor will issue from a specific point of the flower only, so that it looses its illusiveness, and besides such odor may be excessive, as long as larger quantities of the perfume are available at the beginning, although it wanes thereafter until it disappears altogether.

There are known today solid materials, which contain perfumes in high concentration, and in which the odor has a substantially lasting property, because the volatile essential oil is suitably bound, so that it is only gradually released, being mixed, for instance with a less volatile material which may be temporarily solid, the setting free of the perfume depending upon the speed of release of the less volatile matter. Such substantially solid material, which retardedly releases a suitable odor—although it might readily be made available as a foil—is however not suitable for executing an artificial flower therein. In that case the odor would also not issue out from the flower, but would radiate in all directions therefrom, which is not in simulation of a natural flower.

As a matter of example, for instance, it has been suggested before to incorporate a suitable perfume in naphthalene, so that the perfume might be released, as the naphthalene evaporates. In the liquid mixture of naphthalene and a suitable perfume the artificial flower was dipped, so that the flavor was eventually provided with a solid coating of the mixture. But such a coating will of course change the appearance of the artificial flower in a detrimental way, particularly where it is applied as a heavier coating, which is to impart to the flower a lasting scent. Furthermore such a scent would not be given out by the artificial flower in a manner simulating the fragrance of a natural flower.

The instant invention solves this problem and meets the difficulties of the prior art by providing in a fabricated article a suitable distribution of a substantially solid material, which retardedly releases a suitable odor. Thus the flower or bloom is executed in part only in said material, said part being particularly suited by way of allocation of the material to establish the desired fragrance. For this purpose it has been found to be particularly useful to provide the odorless material in the form of filaments. Thus a foil of such material might be incorporated in the form of strips in simulation of the sepals on an unopened flower or bud. Or it may be incorporated as a filament in simulation of parts of the stamens or pistils of a flower, or as such part is a whole.

An illustration of such an embodiment of the instant invention is found in the accompanying drawing in which Fig. 1 shows the elevation of a flower, Fig. 2 that of a garment.

The fabricated article consists, for example, of a single flower on a background 9, which is for instance a loose matting of green. The envelope 10 of the bloom is made of a material suited therefore by its appearance and texture, such material being odorless. Upon the inside of the bloom arise the pairs of ends of the filaments 11, 12 and 13, which are executed in a substantially solid material which retardedly releases the odor belonging to the simulated flower. From the bloom extend the suitably shaped pairs of ends of the filaments 11, 12, 13, each of which may be looped back upon itself substantially at the center, where it is suitably tied into the base 14 of the bloom. The filament, as a strip of foil or as a rod made of the material which retardedly releases the desired odor is either inherently resilient or the desired resilience has been imparted thereto by suitable shaping or coiling or reinforcements, in the provision of which a further simulation of the cross-section of the natural filament may be followed out.

Such an arrangement of the material which retardedly releases a suitable odor as part only of the bloom and more particularly as filament which is exposed in the bloom and may even extend therefrom, provides the desired distribution of fragrance.

In a bloom, which is a cluster of petals, filaments of the material in question may be loosely interspersed between the petals, and will serve, if they are partially stiff, to assist in preserving the shape of the bloom and in preventing a crushing thereof.

As scenting part of a garment the material which retardedly releases a suitable odor may be incorporated, e. g. as a sizing, in the thread 16 by which a garment, like 17 in Fig. 2, is sewed, or in ribbons by which such garments are gathered in or retained in shape.

Having thus described our invention in detail, yet we do not wish to be limited thereby, except as the state of the art and the appended claims may require, for it is obvious that various modifications and changes may be made in the form of embodiment of our invention, without departing from the spirit and scope thereof.

What we claim is:

1. A scented fabricated article comprising a part executed in an unscented material substantially giving to said article the desired appearance, and a filament made of a material which retardedly releases a suitable odor and is exposedly fastened upon said part.

2. A scented fabricated article comprising a part executed in an unscented material substantially giving to said article the desired appearance, and a filament made of a resilient material which retardedly releases a suitable odor and exposedly extends out from said part.

3. A scented fabricated article comprising a part executed in an unscented material substantially giving to said article the desired appearance, and a filament made of a strip of foil which retardedly releases a suitable odor and is exposedly fastened upon said part.

4. A scented fabricated flower comprising artificial petals, and a filament made of a material which retardedly releases a suitable odor and is exposedly fastened upon said artificial petals.

5. A scented fabricated flower comprising artificial petals, and a filament made of a strip of foil which retardedly releases a suitable odor and is exposedly fastened upon said artificial petals.

6. As a scented, fabricated article a garment sewed with a thread made of a substantially solid material which retardedly releases a suitable odor.

7. As a scented, fabricated article a garment tied in by a ribbon made of a substantially solid material which retardedly releases a suitable odor.

CARL WOIWODE.
ADOLPH COHEN.